(12) United States Patent
Reyes, Jr. et al.

(10) Patent No.: US 11,756,698 B2
(45) Date of Patent: Sep. 12, 2023

(54) PASSIVE EMERGENCY FEEDWATER SYSTEM

(71) Applicant: NuScale Power, LLC, Corvallis, OR (US)

(72) Inventors: Jose N. Reyes, Jr., Corvallis, OR (US); John T. Groome, Corvallis, OR (US)

(73) Assignee: NuScale Power, LLC, Corvallis, OR (US)

( * ) Notice: Subject to any disclaimer, the term of this patent is extended or adjusted under 35 U.S.C. 154(b) by 1357 days.

(21) Appl. No.: 15/952,034

(22) Filed: Apr. 12, 2018

(65) Prior Publication Data

US 2018/0261343 A1    Sep. 13, 2018

Related U.S. Application Data

(63) Continuation of application No. 13/425,776, filed on Mar. 21, 2012, now Pat. No. 9,984,777, which is a continuation-in-part of application No. 12/121,733, filed on May 15, 2008, now Pat. No. 8,170,173.

(60) Provisional application No. 60/988,348, filed on Nov. 15, 2007.

(51) Int. Cl.
*G21C 15/18*    (2006.01)
*G21C 1/32*    (2006.01)
*G21C 15/26*    (2006.01)

(52) U.S. Cl.
CPC ............... *G21C 15/18* (2013.01); *G21C 1/32* (2013.01); *G21C 15/26* (2013.01); *Y02E 30/30* (2013.01)

(58) Field of Classification Search
CPC . G21C 1/03; G21C 1/14; G21C 15/18; G21C 1/32

USPC ........................... 376/282, 402, 403
See application file for complete search history.

(56) References Cited

U.S. PATENT DOCUMENTS 3,151,034 A  *  9/1964  Douglass, Jr. ............ G21C 1/12
                                              376/395
3,226,300 A     12/1965  Zmola
3,266,999 A  *  8/1966  Wood ....................... G21C 1/10
                                              376/383

(Continued)

FOREIGN PATENT DOCUMENTS

CN          1038718 A        1/1990
CN          101149990        3/2008

(Continued)

OTHER PUBLICATIONS

International Search Report and Written Opinion for PCT/US2008/082644 dated Oct. 21, 2009; 12 pages.

(Continued)

*Primary Examiner* — Lily C Garner
(74) *Attorney, Agent, or Firm* — Perkins Coie LLP

(57) ABSTRACT

A power module assembly may include a reactor vessel containing a primary coolant and one or more inlets configured to draw a secondary coolant from the containment cooling pool in response to a loss of power and/or a loss of coolant. One or more outlets may be submerged in the containment cooling pool and may be configured to vent the secondary coolant into the containment cooling pool. A heat exchanger may be configured to remove heat from the primary coolant, wherein the heat may be removed by circulating the secondary coolant from the containment cooling pool through the heat exchanger via natural circulation.

13 Claims, 4 Drawing Sheets

(56) References Cited

U.S. PATENT DOCUMENTS

| | | | |
|---|---|---|---|
| 3,276,965 A | 10/1966 | Leyse | |
| 3,290,222 A * | 12/1966 | Schoessow | G21C 1/322 |
| | | | 376/282 |
| 3,307,913 A | 3/1967 | Chave | |
| 3,599,589 A | 8/1971 | Busey | |
| 3,859,166 A | 1/1975 | Flynn | |
| 3,865,688 A | 2/1975 | Kleimola | |
| 3,984,282 A * | 10/1976 | Kleimola | G21C 9/00 |
| | | | 376/293 |
| 3,986,367 A | 10/1976 | Kalpins | |
| 4,046,628 A * | 9/1977 | Middleton | G21C 15/00 |
| | | | 376/282 |
| 4,076,585 A | 2/1978 | Cachera | |
| 4,081,323 A | 3/1978 | Gans et al. | |
| 4,088,535 A * | 5/1978 | Thompson | G21D 5/02 |
| | | | 376/293 |
| 4,210,614 A | 7/1980 | Kleimola | |
| 4,302,291 A | 11/1981 | Severs et al. | |
| 4,363,780 A * | 12/1982 | Hannerz | G21C 15/18 |
| | | | 376/282 |
| 4,473,528 A | 9/1984 | Kleimola | |
| 4,666,661 A | 5/1987 | Fredell | |
| 4,668,467 A | 5/1987 | Miler | |
| 4,678,626 A | 7/1987 | Germer | |
| 4,696,791 A * | 9/1987 | Straub | G21D 9/00 |
| | | | 976/DIG. 186 |
| 4,784,824 A | 11/1988 | Gandrille | |
| 4,793,964 A | 12/1988 | Fajeau | |
| 4,815,697 A | 3/1989 | Skoda | |
| 4,986,956 A | 1/1991 | Garabedian | |
| 5,011,652 A * | 4/1991 | Tominaga | G21C 15/18 |
| | | | 376/293 |
| 5,021,212 A | 6/1991 | Kataoka | |
| 5,043,136 A * | 8/1991 | Hunsbedt | G21C 15/18 |
| | | | 376/293 |
| 5,080,857 A * | 1/1992 | Miller | G21C 9/016 |
| | | | 376/280 |
| 5,087,408 A | 2/1992 | Tominaga | |
| 5,091,143 A * | 2/1992 | Tate | G21C 1/084 |
| | | | 376/282 |
| 5,098,646 A * | 3/1992 | Oosterkamp | G21C 9/012 |
| | | | 376/293 |
| 5,102,616 A * | 4/1992 | Gardner | G21C 15/18 |
| | | | 376/282 |
| 5,108,695 A * | 4/1992 | Schulz | G21C 15/18 |
| | | | 376/298 |
| 5,169,595 A * | 12/1992 | Cooke | G21C 15/18 |
| | | | 376/282 |
| 5,198,184 A | 3/1993 | Hiramoto | |
| 5,211,906 A * | 5/1993 | Hatamiya | G21C 13/00 |
| | | | 376/293 |
| 5,247,553 A | 9/1993 | Herring | |
| 5,263,061 A * | 11/1993 | Lamuro | G21D 3/00 |
| | | | 165/53 |
| 5,267,283 A | 11/1993 | Berg et al. | |
| 5,272,737 A * | 12/1993 | Fujii | G21C 15/18 |
| | | | 376/293 |
| 5,276,720 A | 1/1994 | Oosterkamp | |
| 5,295,169 A * | 3/1994 | Tominaga | G21C 15/18 |
| | | | 376/293 |
| 5,309,487 A * | 5/1994 | McDermott | G21C 15/18 |
| | | | 376/250 |
| 5,345,481 A | 9/1994 | Oosterkamp | |
| 5,349,616 A * | 9/1994 | Nakayama | G21C 15/18 |
| | | | 376/282 |
| 5,434,894 A | 7/1995 | Chiang et al. | |
| 5,459,768 A | 10/1995 | Stockhausen | |
| 5,570,401 A | 10/1996 | Gluntz | |
| 5,579,355 A | 11/1996 | Leidemann | |
| 5,748,693 A * | 5/1998 | Hartmann | G21C 15/182 |
| | | | 376/282 |
| 5,761,262 A * | 6/1998 | No | G21C 9/012 |
| | | | 376/298 |
| 5,828,714 A | 10/1998 | DeVenne | |
| 5,872,825 A | 2/1999 | Eckardt | |
| 6,249,561 B1 * | 6/2001 | Aburomia | G21C 15/18 |
| | | | 376/283 |
| 6,269,873 B1 | 8/2001 | Gautier | |
| 6,718,001 B2 * | 4/2004 | Hidaka | G21C 15/18 |
| | | | 376/283 |
| 6,795,518 B1 * | 9/2004 | Conway | G21C 15/18 |
| | | | 376/283 |
| 6,885,720 B2 | 4/2005 | Fennern | |
| 6,944,255 B2 * | 9/2005 | Hattori | G21C 1/32 |
| | | | 376/405 |
| 7,558,360 B1 | 7/2009 | Gamble et al. | |
| 7,606,344 B2 * | 10/2009 | Meseth | G21C 9/012 |
| | | | 376/403 |
| 8,170,173 B2 | 5/2012 | Reyes, Jr. | |
| 8,542,792 B1 | 9/2013 | Young et al. | |
| 8,559,583 B1 | 10/2013 | Sato et al. | |
| 8,588,360 B2 | 11/2013 | Reyes, Jr. et al. | |
| 8,731,130 B2 | 5/2014 | Reyes | |
| 9,984,777 B2 | 5/2018 | Reyes | |
| 10,726,959 B2 * | 7/2020 | Katono | G21C 13/02 |
| 2004/0105518 A1 | 6/2004 | Abel et al. | |
| 2004/0244841 A1 | 12/2004 | Modro et al. | |
| 2005/0069079 A1 | 3/2005 | Boardman et al. | |
| 2009/0129530 A1 | 5/2009 | Reyes, Jr. | |
| 2009/0129531 A1 | 5/2009 | Reyes et al. | |
| 2009/0161812 A1 | 6/2009 | Reyes et al. | |
| 2010/0111242 A1 | 5/2010 | Helmersson et al. | |
| 2012/0177168 A1 | 7/2012 | Reyes | |
| 2012/0294408 A1 | 11/2012 | Reyes, Jr. | |

FOREIGN PATENT DOCUMENTS

| | | |
|---|---|---|
| CN | 101999149 | 3/2011 |
| CN | 103383865 | 11/2013 |
| DE | 1564553 A1 | 1/1970 |
| DE | 19853618 C1 | 6/2000 |
| EP | 0353867 | 2/1990 |
| EP | 0359716 | 3/1990 |
| JP | 64028592 | 1/1989 |
| JP | 5055412 | 3/1993 |
| JP | 6265672 A | 9/1994 |
| WO | 1995/029486 | 11/1995 |
| WO | 2002/073625 | 9/2002 |
| WO | 2009/097034 | 8/2009 |
| WO | 2009064654 A4 | 10/2009 |

OTHER PUBLICATIONS

Lu, Xiang-hui et al; Concept Design of Residual Heat Removal System with Passive Moderator of TANES, (full English translation not available); China Academic Journal of Electronic Publishing House, Nuclear Power Engineering; vol. 24, No. 2; Apr. 2003; 5 pages.

IAEA, IAEA Tecdoc 1281—Natural Circulation Data and Methods for Advanced Water Cooled Nuclear Power Plan; Apr. 2002, 252 pages, Nuclear Power Technology Development Section, International Atomic Energy Agency, Vienna, Austria.

IAEA, IAEA Tecdoc 1536—Status of Small Reactor Designs Without on-Site Refueling, Jan. 2007; 870 pages, Nuclear Power Technology Development Section, International Atomic Energy Agency, Vienna, Austria; <http://www.pub.iaea.org/MTDC/publications/PDF/tb_1536_web.pdf; 799 pages [uploaded in 8 sections].

IAEA, IAEA Tecdoc 1391—Status of Advanced Light Water Reactor Designs 2004; May 2004, pp. 279-306; 489-512, Nuclear Power Technology Development Section, International Atomic Energy Agency, Vienna, Austria.

IAEA, IAEA Tecdoc 1485—Status of Innovative Small and Medium Sized Reactor Designs 2005; Mar. 2006; pp. 93-162, Nuclear Power Technology Development Section, International Atomic Energy Agency, Vienna, Austria.

European Patent Office; Office Action for EP App. No. 08871861.4, dated Jan. 14, 2013; 5 pages.

(56) References Cited

OTHER PUBLICATIONS

Canadian Patent Office, Office Action for CA App. No. 2705482, dated Jan. 15, 2013; 4 pages.
Jose N. Reyes et al., Testing of the Multi-Application Small Light Water Reactor (MASLWR) Passive Safety Systems, Nuclear Engineering and Design 237, Jan. 28, 2007; pp. 1999-2005.
Modro, S.M., et al., "Multi-Application Small Light Water Reactor Final Report" Idaho National Engineering and Environmental Laboratory, Dec. 2003; Idaho Falls, ID, USA.
Generic Safety Issue 163, "Multiple Steam Generator Tube Leakage", Identified in NRC Memorandum, Jun. 1992.
USNRC Information Notice No. 2001-16: "Recent Foreign and Domestic Experience with Degradation of Steam Generator Tubes and Internals"; Oct. 31, 2001.
Hirano, H., et al., "Experimental study of natural convection heat transfer of air in a cube below atmospheric pressure." International Journal of Heat and Mass Transfer, vol. 46, Issue 23, Nov. 2003, pp. 4483-4488.
ISA, Written Opinion of International Application No. PCT/US08/82617, dated Jul. 3, 2009. 9 pages.
Reactor, boiler, & Auxiliaries—Course 233, Containment System, Jul. 1981, pp. 1-18.
Reyes, J. Introduction to NuScale Design PPT. 26 pages.

\* cited by examiner

PRIOR ART

PASSIVE EMERGENCY FEEDWATER SYSTEM

This application is a continuation of U.S. application Ser. No. 13/425,776 filed on Mar. 21, 2012, which is a continuation-in-part of U.S. application Ser. No. 12/121,733 filed on May 15, 2008, now issued U.S. Pat. No. 8,170,173, issued May 1, 2012, which claims priority to provisional application U.S. application Ser. No. 60/988,348, filed Nov. 15, 2007, which are all herein incorporated by reference in their entireties.

TECHNICAL FIELD

The invention relates to a cooling system for a nuclear reactor.

BACKGROUND

In nuclear reactors designed with passive operating systems, the laws of physics are employed to ensure that safe operation of the nuclear reactor is maintained during normal operation or even in an emergency condition without operator intervention or supervision, at least for some predefined period of time. A Multi-Application Small Light Water Reactor project conducted with the assistance of the Idaho National Engineering and Environmental Laboratory, NEXANT and the Nuclear Engineering Department of Oregon State University sought to develop a safe and economical natural light water reactor. FIG. 1 illustrates a nuclear reactor design 5 that resulted from this project.

The nuclear reactor design 5 includes a reactor core 6 surrounded by a reactor vessel 2. Water 10 in the reactor vessel 2 surrounds the reactor core 6. The reactor core 6 is further located in a shroud 22 which surround the reactor core 6 about its sides. When the water 10 is heated by the reactor core 6 as a result of fission events, the water 10 is directed from the shroud 22 and out of a riser 24. This results in further water 10 being drawn into and heated by the reactor core 6 which draws yet more water 10 into the shroud 22. The water 10 that emerges from the riser 24 is cooled down and directed towards the annulus 23 and then returns to the bottom of the reactor vessel 2 through natural circulation. Pressurized steam 11 is produced in the reactor vessel 2 as the water 10 is heated.

A heat exchanger 35 circulates feedwater and steam in a secondary cooling system 30 in order to generate electricity with a turbine 32 and generator 34. The feedwater passes through the heat exchanger 35 and becomes super heated steam. The secondary cooling system 30 includes a condenser 36 and feedwater pump 38. The steam and feedwater in the secondary cooling system 30 are isolated from the water 10 in the reactor vessel 2, such that they are not allowed to mix or come into direct contact with each other.

The reactor vessel 2 is surrounded by a containment vessel 4. The containment vessel 4 is placed in a pool of water 16. The pool of water 16 and the containment vessel 4 are below ground 9 in a reactor bay 7. The containment vessel 4 is designed so that water or steam from the reactor vessel 2 is not allowed to escape into the pool of water 16 or the surrounding environment. A steam valve 8 is provided to vent steam 11 from the reactor vessel 2 into an upper half 14 of the containment vessel 4. A submerged blowdown valve 18 is provided to release the water 10 into suppression pool 12 containing sub-cooled water.

During a loss of feedwater flow, the nuclear reactor 5 is designed to respond by scramming the reactor core 6, flooding the containment vessel 4 or depressurizing the reactor vessel 2. The latter two of these responses result in the nuclear reactor 5 being shut down and unable to generate electricity for an extended period of time.

The present invention addresses these and other problems.

SUMMARY OF THE INVENTION

Figure 1:
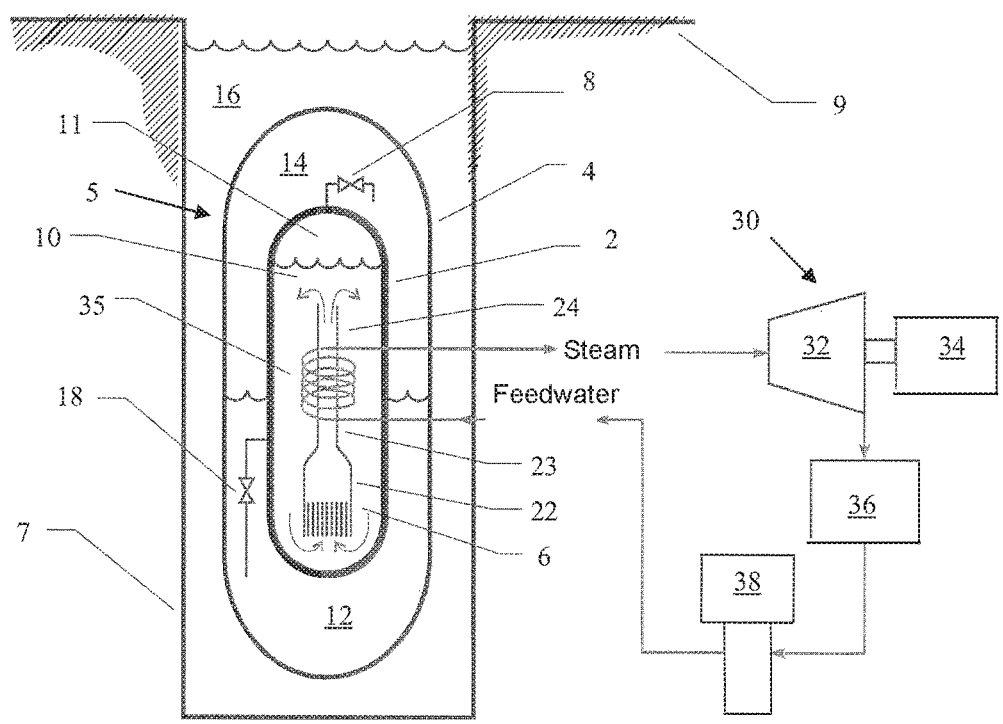
FIG. 1 illustrates a nuclear power system known in the art.

A power module assembly may include a reactor vessel containing a primary coolant and one or more inlets configured to draw a secondary coolant from the containment cooling pool in response to a loss of power and/or a loss of coolant. One or more outlets may be submerged in the containment cooling pool and may be configured to vent the secondary coolant into the containment cooling pool. A heat exchanger may be configured to remove heat from the primary coolant, wherein the heat may be removed by circulating the secondary coolant from the containment cooling pool through the heat exchanger via natural circulation.

A power module assembly may include a reactor vessel containing a primary coolant, means for removing heat from the primary coolant, means for drawing emergency feedwater from a containment cooling pool in response to a loss of power and/or a loss of coolant, and means for venting the emergency feedwater into the containment cooling pool. The means for venting may be submerged in the containment cooling pool. The power module assembly may further include means for circulating the emergency feedwater from the containment cooling pool through the means for removing heat and back to the containment cooling pool, wherein the emergency feedwater is circulated through natural circulation.

A method may include removing heat from a primary coolant contained within a reactor vessel, drawing emergency feedwater into one or more inlets from a containment cooling pool in response to a loss of power and/or a loss of coolant, and venting the emergency feedwater from one or more vents into the containment cooling pool, wherein the one or more vents are submerged in the containment cooling pool. The method may further include circulating the emergency feedwater from the containment cooling pool through the reactor vessel and back to the containment cooling pool, wherein the emergency feedwater is circulated through natural circulation.

Description of Example Embodiments

Conventional nuclear facilities are expensive to license and build, with significant upfront investment costs and delayed return of profits. In addition to energy cost considerations, efficiency requirements, and reliability concerns, today's nuclear reactor designs must also take into account issues of nuclear proliferation, terrorist activities, and a heightened awareness of environmental stewardship.

Developing countries that could otherwise greatly benefit from nuclear power are frequently left to resort to other energy sources such as coal, gas or hydroelectric power generators that produce significant amounts of pollution or have other detrimental environmental impact. These developing countries may not have the technological or natural resources that enable them to build a nuclear power plant. Countries that have already developed nuclear power may be hesitant to introduce these technologies into the developing countries out of concern of the loss of control of the nuclear materials or technology.

Passively safe nuclear power systems help address some of these concerns. Further system improvements and innovative designs are expected to usher in a new era of nuclear power as a globally viable primary energy source.

In the Multi-Application Small Light Water Reactor (MASLWR) design, a loss of feedwater flow requires actuation of the long-term cooling mode of operation to provide for core cooling. For example, scramming the reactor core, flooding the containment vessel or depressurizing the reactor vessel. The latter two of these responses result in the nuclear reactor being shut down and unable to generate electricity for an extended period of time. Furthermore, no provision was provided in the MASLWR design for decay heat removal during a loss of site power.

Figure 2:
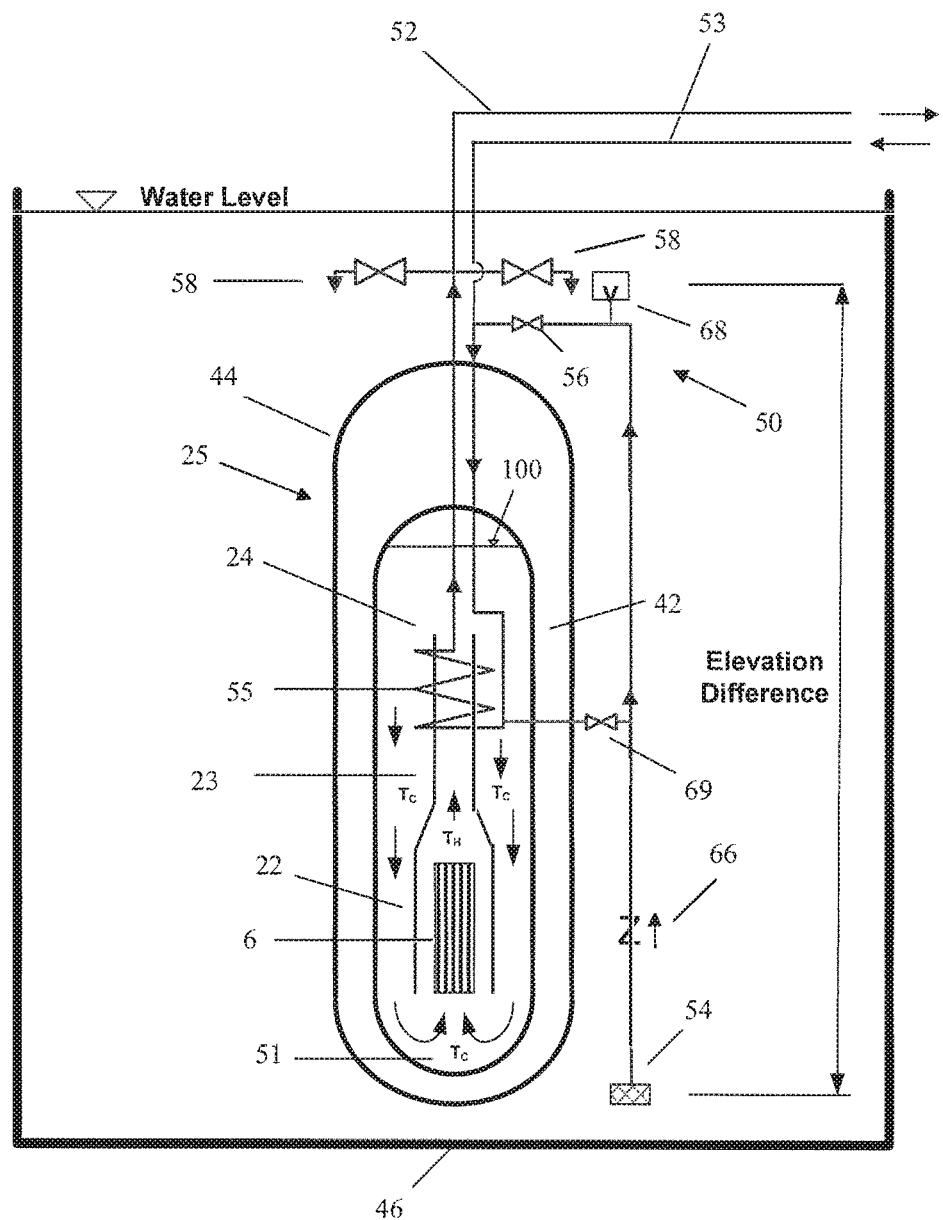
FIG. 2 illustrates a novel power module assembly including an secondary cooling system.

FIG. 2 illustrates a novel power module assembly 25 including a secondary cooling system 50. The power module assembly 25 includes an internally dry containment vessel 44. The containment vessel 44 is cylindrical in shape, and has spherical upper and lower ends. The entire power module assembly 25 may be submerged in a containment cooling pool 46 which serves as an ultimate heat sink. The containment vessel 44 may be welded or otherwise sealed to the environment, such that liquids and gas do not escape from, or enter, the power module assembly 25. The containment vessel 44 may be bottom supported, top supported or supported to about its center. Supporting the containment vessel 44 at the top may facilitate maintenance and removal of the power module assembly 25 from the containment cooling pool 46.

A reactor vessel 42 is located or mounted inside the containment vessel 44. An inner surface of the reactor vessel 42 may be exposed to a wet environment including a primary coolant 100 or liquid, such as water, and an outer surface may be exposed to a dry environment such as air. The reactor vessel 42 may be made of stainless steel or carbon steel, may include cladding, and may be supported within the containment vessel 44.

The power module assembly 25 may be sized so that it can be transported on a rail car. For example, the containment vessel 44 may be constructed to be approximately 4.3 meters in diameter and 17.7 meters in height (length). By completely sealing the containment vessel 44, access to the reactor core 6 may be restricted. Any unauthorized access or tampering may be monitored. Furthermore, the subterranean profile of a nuclear power system makes it less visible and easier to conceal. The containment cooling pool 46 may be covered with a protective shield (not shown) to further isolate the power module assembly 25 from outside threats or airborne objects such as planes or missiles.

The containment vessel 44 encapsulates and, in some conditions, cools the reactor core 6. It is relatively small, has a high strength and may be capable of withstanding six or seven times the pressure of conventional containment designs in part due to its smaller overall dimensions. Given a break in the primary cooling system of the power module assembly 25 no fission products are released into the environment. The primary coolant 100 remains entirely contained in the containment vessel 44.

The reactor core 6 is illustrated as being submerged or immersed in a primary coolant 100, such as water. The reactor vessel 42 houses the primary coolant 100 and the reactor core 6. A shroud 22 surrounds the reactor core 6 about its sides and serves to direct the primary coolant 100 up through an annulus 23 and out a riser 24 located in the upper half of the reactor vessel 42 as a result of natural circulation of the primary coolant 100. In one embodiment, the reactor vessel 42 is approximately 2.7 meters in diameter and includes an overall height (length) of 13.7 meters. The reactor vessel 42 may include a predominately cylindrical shape with spherical upper and lower ends. The reactor vessel 42 is normally at operating pressure and temperature.

In one embodiment, the containment vessel 44 is internally dry and may operate at atmospheric pressure with wall temperatures at or near the temperature of the containment cooling pool 46. The containment vessel 44 may be internally dry during normal operation of the power module assembly 25. In some examples, the containment vessel may remain internally dry after an emergency operating condition is detected and/or after an emergency operation is initiated in response to the emergency operating condition.

The emergency operating condition may include a loss of secondary coolant flow, a loss of on-site power, and/or a loss of off-site power. For example, a loss of power condition may result when the electricity grid providing power to the power module assembly 25 and/or auxiliary systems fails to provide power, or fails to provide sufficient power to operate one or more electrical devices or systems. The electricity grid may comprise an external power grid operated by a power company, or an internal grid developed primarily for plant operation. In still other examples, a loss of power condition may result when an on-site generator runs out of fuel and/or When an on-site power cell, fuel cell, battery, or other type of electrical storage device runs out of power.

During normal operation, thermal energy from the fission events in the reactor core 6 causes the primary coolant 100 to heat. As the primary coolant 100 heats up, it becomes less dense and tends to rise up through the riser 24. As the primary coolant 100 cools down, it becomes relatively denser than the heated coolant and is circulated around the outside of the annulus 23, down to the bottom of the reactor vessel 42 and up through the shroud 22 to once again be heated by the reactor core 6. This natural circulation causes the primary coolant 100 to cycle through the reactor core 6, transferring heat to a secondary cooling system 50 to generate electricity at a generator, such as generator 34 of FIG. 1.

The secondary cooling system 50 comprises an inlet line 53 configured to deliver a secondary coolant to a heat exchanger 55 that operates as a heat sink for the power module assembly 25. An outlet line 52 is connected to the heat exchanger 55 and is configured to remove heat from the reactor core 6 by circulating the secondary coolant through the primary coolant contained in the reactor vessel 42. The inlet line 53 and outlet line 52 therefore serve as a means of delivery of the secondary coolant for the secondary cooling system 50. Relatively cool secondary coolant is transported to the heat exchanger 55 via the inlet line 53, whereas as relatively hot or superheated coolant is transported from the heat exchanger 55 to the generator via the outlet line 52.

The secondary cooling system 50 further comprises one or more inlet ports 54 adapted to supply emergency feedwater to the inlet line 53. In one embodiment, the emergency feedwater supply is contained in the containment cooling pool 46. The containment cooling pool 46 may contain water or some other liquid coolant. One or more outlet valves 58 may be connected to the outlet line 52 and configured to vent the emergency feedwater after it has circulated through the heal exchanger 55. One or more valves, such as valve 56 and/or valve 69 may be provided between the inlet port 54 and the inlet line 53 to direct the flow of emergency feedwater or secondary coolant to the inlet line 53. Valve 56 may be located at an elevation that is above the containment vessel 44 such that the emergency feedwater may be added to the inlet line 53 at a position above the containment vessel 44. Valve 69 may be located at a lower elevation such that the emergency feedwater may be added to the inlet line 53 at a point adjacent the heat exchanger 55. In one example, the emergency feedwater may be added directly to the heat exchanger 55 after passing through valve 69.

Although FIG. 2 illustrates both valve 56 and valve 69, some examples only include one or the other of the valves 56, 69. Still other examples may include both valves 56, 59 that may be configured to operate concurrently and/or as backup systems for each other. The inlet port 54 may include an inlet screen to filter contaminants in the containment cooling pool 46. A check valve 66 may be configured to limit fluid flow in one direction.

The secondary cooling system 50 may be configured to circulate the emergency feedwater through the heat exchanger 55 by natural circulation. The natural circulation may be accomplished due to a temperature difference between the liquid in the containment cooling pool 46 and the primary coolant. The liquid, or emergency feedwater, undergoes a temperature change as it passes through the heat exchanger 55. The natural circulation may further be accomplished or augmented as a result of the temperature change of the emergency feedwater and an elevation difference of the inlet ports 54 and the outlet valves 58. In one embodiment, the one or more inlet ports 54 are located near the bottom of the containment cooling pool 46.

As previously described, the inlet line 53 may be connected to a feedwater pump, such as pump 38 of FIG. 1, and the outlet line 52 may be connected to a steam turbine, such as turbine 32 of FIG. 1. The secondary cooling system 50 is able to provide natural circulation of the emergency feedwater without the assistance of a feedwater pump or external power source.

During a loss of power scenario, an external source of feedwater provided through inlet line 53 may be made temporarily or permanently unavailable. For example, feedwater pump 38 (FIG. 1) may cease to function as a result of the loss of on-site power. As discussed above, emergency feedwater obtained from the containment cooling pool 46 may nevertheless be provided to the heat exchanger via natural circulation provided by the secondary cooling system 50. The secondary coolant and/or emergency feedwater remain physically and/or chemically separated from the primary coolant both prior to and during any emergency operating condition. Whereas heat contained within the primary coolant may be transferred to the secondary coolant and/or emergency feedwater passing through the heat exchanger, the coolants themselves remain isolated from each other such that they are not allowed to intermix.

During a loss of feedwater flow scenario, a reactor scram and turbine trip are initiated by an actuation signal. As steam pressure in the secondary cooling system 50 increases, the one or more outlet valves 58 are opened in a staged manner to depressurize the steam generator. The one or more outlet valves 58 may include redundant fail safe vent valves that discharge the secondary coolant to a set of submerged sparger nozzles located below the surface of the containment cooling pool 46. After a preset time delay from actuation of the outlet valves 58, a second set of valves associated with the one or more inlet ports 54 may be opened in such a way as to align the feedwater supply piping with the bottom of the containment cooling pool 46.

As the steam generator depressurizes, a natural circulation flowpath is established from the inlet ports 54 through the heat exchanger 55 and out the outlet valves 58. Liquid from the containment cooling pool 46 provides a makeup source of emergency feedwater. Steam produced in the heat exchanger 55 and released through the outlet valves 58 is condensed in the containment cooling pool 46. The outlet valves 58 may be positioned just below the surface of the containment cooling pool 46.

The secondary cooling system 50 may be configured to remove the liquid from the containment cooling pool 46 during one or more types of emergency operation. The emergency operation may include a loss of coolant accident, a loss of secondary coolant flow, a loss of on-site power, among others.

Figure 3:
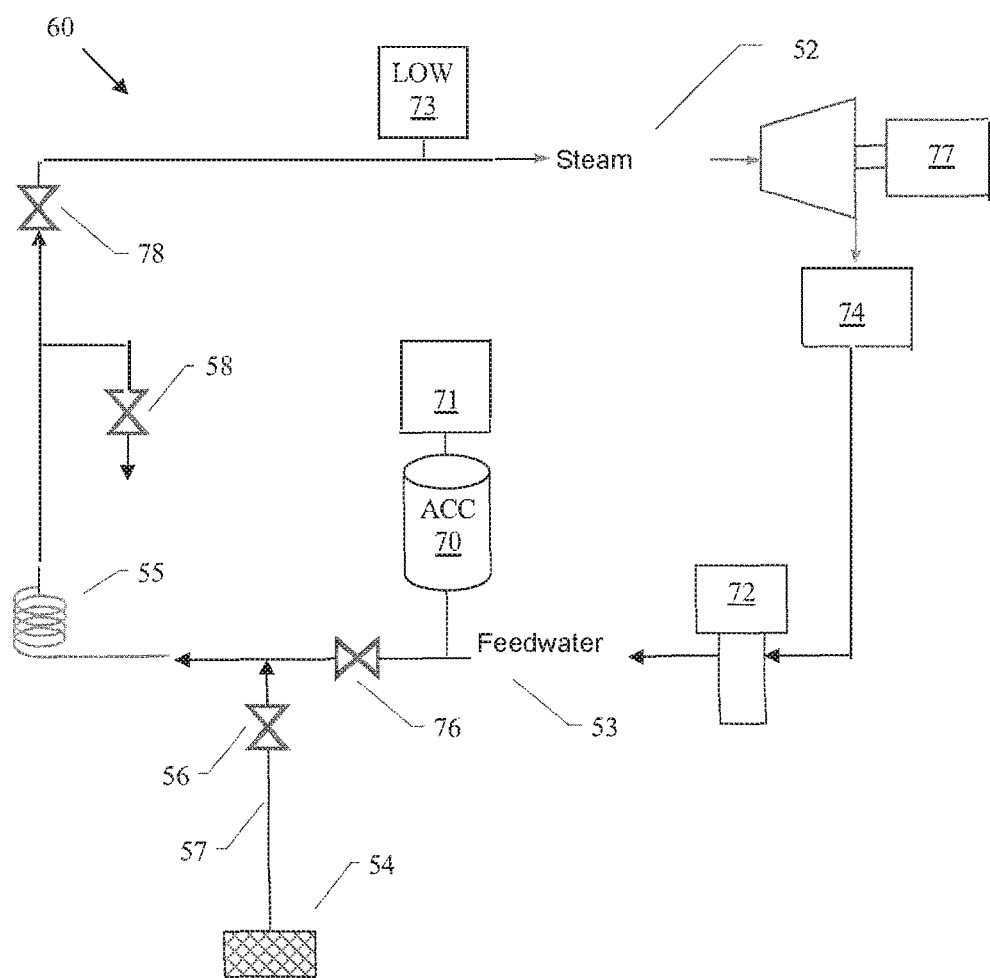
FIG. 3 illustrates an embodiment of a novel emergency cooling system.

FIG. 3 illustrates an embodiment of a novel cooling system 60. The cooling system may be configured to operate with a nuclear reactor such as the power module assembly 25 of FIG. 2. The cooling system 60 comprises inlet line 53 and outlet line 52 configured to remove heat from a reactor core by circulating a coolant through heat exchanger 55. Relatively cool coolant is transported to the heat exchanger 55 via the inlet line 52, whereas as relatively hot or superheated coolant is transported from the heat exchanger 55 to the generator via the outlet line 52.

The cooling system 60 further comprises one or more inlet ports 54 adapted to supply emergency feedwater to the inlet line 53. In one embodiment, the emergency feedwater supply is contained in a cooling pool 46 (FIG. 2), and comprises water or some other coolant. A cooling pipe 57 connecting the inlet port 54 to the inlet line 53 may be insulated to reduce an amount of heating of the emergency feedwater traveling through the cooling pipe 57 that might otherwise occur due to a temperature difference of the coolant located at the top and bottom of the cooling pool. One or more outlet pots 58 may be connected to the outlet line 52 to vent the emergency feedwater after it has circulated through the heat exchanger 55. The emergency cooling system 60 further comprises one or more accumulator tanks 70 configured to inject coolant into the inlet line 53 when a loss of feedwater flow is detected. The one or more accumulator tanks 70 provide coolant to the heat exchanger 55 until natural circulation of the emergency feedwater is established via the inlet ports 54 and outlet ports 58.

The one or more accumulator tanks 70 may be partially filled with water. The accumulator tanks 70 may be pressurized with a non-condensable gas, such as nitrogen. In one embodiment, a bladder 71 is provided with, or in, the accumulator tank 70 to prevent the release of the non-condensable gas (e.g. nitrogen) into the heat exchanger 55. During a loss of feedwater flow scenario, the accumulator tanks 70 inject the water into the inlet line 53. The injection of water serves to subcool the water in the reactor vessel while natural circulation is established in the cooling system.

Operation

Example operations of various embodiments is now provided, making reference to the secondary cooling system 50 of FIG. 2 and the emergency cooling system 60 of FIG. 3. The reactor core 6 undergoes a hot shutdown condition with control rods inserted. The shutdown condition may result from an emergency operation of the power module assembly 25 or the secondary cooling system. A normal steam flow through the outlet line 52 and a feedwater flow through the inlet line 53 are isolated. The inlet port 54 and outlet valve 58 are opened to the containment cooling pool 46. This creates a natural circulation flow path driven by the coolant density difference and elevation difference between the cold water at the inlet port 54 and the outlet valve 58.

Cold water from the containment cooling pool. 46 is drawn into the heat exchanger 5, where it is heated and vented into the containment cooling pool 46. The heat exchanger 55 removes heat from fluid, for example the coolant 100, in the annulus 23 creating a density difference between the fluid inside the riser 24 and the fluid in the annulus 23. Because the reactor core 6 is located at an elevation below the heat exchanger 55, a buoyancy force is created that drives warm fluid up through the shroud 22 and riser 24 and drives cold fluid down through the annulus 23 into the lower plenum 51. This creates a natural circulation flow through the reactor core 6 that removes the decay heat.

During a loss of main feedwater flow, a low discharge pressure of the Low Main Feedwater Pump 72 or a low water level of the Steam Generator 74 may result in a reactor trip. After a time delay from the reactor trip, the main steam vent valves (outlet valves 58) are opened in a staged manner. When a low level of the Accumulator tank 70 and a low discharge pressure of the Low Main Feedwater Pump 72 are detected, the Main Feedwater Stop Valve 76 is closed. Then, the inlet valve (inlet ports 54) is opened in order to align the cooling flow to the containment cooling pool 46.

In various embodiments, the same operations as discussed for the above loss of main feedwater flow condition may be followed during a station blackout or loss of power to the on-site facility.

During a loss of coolant accident, a low water level of the Low Pressurizer 73, a low pressure of the coolant system, or a high pressure of the containment vessel 44 may result in a reactor trip. The Main Steam Isolation Valve 78 and Main Feedwater Stop Valve 76 are closed. If the steam generator pressure 77 does not increase (e.g. there is no steam generator tube rupture) and the steam generator tube band pressures are equal, then the outlet valves 58 may be opened in a staged manner. For example, the Main Feedwater Stop Valve 76 is closed when a low level of the Accumulator tank 70 and a low discharge pressure of the Low Main Feedwater Pump 72 are detected. Additionally, the inlet port 54 may be opened to align the cooling flow to the containment cooling pool 46. The outlet valves 58 may also be opened in a staged manner. A reactor sump valve may be opened when a low differential pressure is detected between the containment vessel 44 and the reactor vessel 42.

Figure 4:
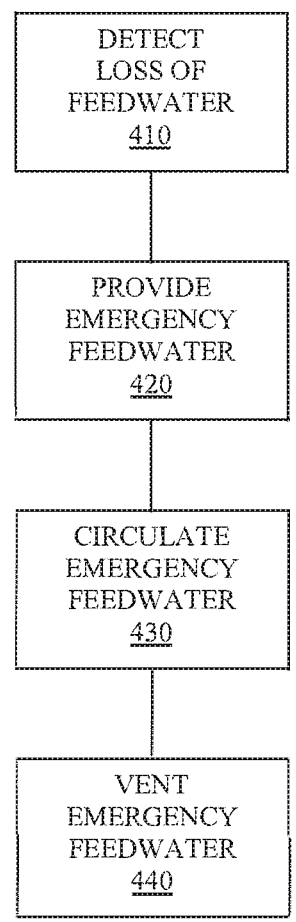
FIG. 4 illustrates a novel method of cooling a nuclear reactor.

FIG. 4 illustrates a novel method of cooling a nuclear reactor. At operation 410, a loss of feedwater condition is detected. The loss of feedwater may be due to a loss of coolant accident, a loss of feedwater pressure, a failed feedwater pump, or a loss of on-site power, such as a station blackout. At operation 420 a feedwater flow from a secondary cooling system is replaced with an emergency feedwater supply.

At operation 430 the emergency feedwater is circulated through a heat exchanger to remove heat from the nuclear reactor. The emergency feedwater is circulated through the heat exchanger through natural circulation. The natural circulation is due to a difference in temperature between the emergency feedwater supply and the emergency feedwater circulating through the heat exchanger.

In one embodiment, the emergency feedwater supply comprises a containment cooling pool surrounding the nuclear reactor. At operation 440, the emergency feedwater is vented into the containment cooling pool. An elevation difference between an outlet port and an inlet port submerged in the containment cooling pool may provide for sustainable natural circulation of the emergency feedwater for more than three days. Depending on the size of the containment cooling pool, in one embodiment, the natural circulation may be maintained upwards of 90 days.

Loss of feedwater flow and decay heat removal is resolved by the various embodiments disclosed herein. The novel systems add significant capability to the MASLWR reactor design by providing a passive means of cooling the nuclear core after a control rod insertion without the need for external power. Various embodiments are able to provide emergency feedwater to the steam generator in the event of a loss of normal feedwater flow, and provide reactor core decay heat removal of the reactor core subsequent to a reactor control rod insertion.

The containment cooling pool serves as a source of makeup feedwater and as a heat sink for decay heat removal. Various embodiments are able to remove core decay heat by directing coolant from the large containment cooling pool through the helical coil heat exchanger tubes located in the reactor vessel annulus. A natural circulation flow path is established as hot water and steam are vented into the containment pool and cold water is drawn into the inlet port.

Various embodiments disclosed herein provide alternate long-term cooling mode of operation and an indefinite heat removal of the reactor core without operator action. Very little mass is lost form the containment pool. Various embodiments can be actuated manually to remove decay heat for maintenance, and the systems are relatively simple, having few if any moving parts. Passive systems do not require on-site power to operate, instead relying on the principles of natural circulation. Furthermore, various embodiments provide for quick restart of a reactor module, providing less operating downtime and increased protection of investor capital.

Although the embodiments provided herein have primarily described a pressurized water reactor, it should be apparent to one skilled in the art that the embodiments may be applied to other types of nuclear power systems as described or with some obvious modification. For example, the embodiments or variations thereof may also be made operable with a boiling water reactor. A boiling water reactor may require larger vessels to produce the same energy output.

Having described and illustrated the principles of the invention in a preferred embodiment thereof, it should be apparent that the invention may be modified in arrangement and detail without departing from such principles. We claim all modifications and variation coming within the spirit and scope of the following claims.

The invention claimed is:

1. A power module assembly comprising:
   a reactor vessel containing a primary coolant;
   a containment vessel surrounding the reactor vessel, wherein the containment vessel is immersed in a containment cooling pool;
   one or more inlets configured to draw emergency feedwater from the containment cooling pool;
   one or more outlets configured to vent the emergency feedwater into the containment cooling pool; and
   a heat exchanger coupled between the one or more inlets and the one or more outlets, and configured to remove heat from the primary coolant by circulating the emergency feedwater, via natural circulation, from the containment cooling pool through the heat exchanger and back to the containment cooling pool, without mixing with the primary coolant, wherein at least one of the inlets is sub merged in the containment cooling pool and is coupled via a sub merged, upwardly extending conduit to an input line of the heat exchanger.

2. The power module assembly according to claim 1, wherein:

at least one of the outlets is submerged in the cooling pool above the at least one inlet and is coupled to an output line of the heat exchanger.

3. The power module assembly according to claim 1, wherein the natural circulation comprises a circulation path of the emergency feedwater entering the one or more inlets, passing through the heat exchanger, exiting the one or more outlets into the containment cooling pool, and re-entering the one or more inlets.

4. The power module assembly according to claim 1, wherein the containment vessel prevents the primary coolant from escaping into the containment cooling pool.

5. The power module assembly according to claim 1, wherein the containment vessel forms a substantially dry containment region around the reactor vessel.

6. An emergency feedwater system for a nuclear reactor vessel that contains a primary coolant, comprising:

a heat exchanger configured to circulate a secondary coolant through the reactor vessel to remove heat from the primary coolant, wherein the reactor vessel is positioned within a containment vessel;

a secondary cooling system configured to circulate emergency feedwater, via natural circulation, from a containment cooling pool in which the containment vessel is immersed, through the heat exchanger, during a loss of power event to remove heat from the primary coolant, without intermixing the primary coolant with the secondary coolant in the secondary cooling system, or with the emergency feedwater; and an inlet submerged in the containment cooling pool and coupled via a submerged, upwardly extending conduit to an input line of the heat exchanger.

7. The emergency feedwater system according to claim 6, further comprising the containment vessel, and wherein the containment vessel encapsulates the nuclear reactor vessel.

8. The emergency feedwater system according to claim 7, wherein the containment vessel forms a dry containment region around the nuclear reactor vessel.

9. The emergency feedwater system according to claim 7, wherein the containment vessel is configured to prohibit a release of the primary coolant into the containment cooling pool.

10. The emergency feedwater system according to claim 6, further comprising:

an outlet submerged in the containment cooling pool and coupled to an output line of the heat exchanger.

11. The emergency feedwater system according to claim 10, including:

a first valve selectively coupling the inlet to the input line; and a second valve selectively coupling the outlet to the output line.

12. The emergency feedwater system according to claim 10, wherein the outlet is located in the containment cooling pool above the inlet.

13. The emergency feedwater system according to claim 6, wherein the secondary cooling system does not include a pump to circulate the emergency feedwater from the containment cooling pool.

* * * * *